POLARISED ELECTROMAGNETIC RELAYS AND LIKE DEVICES

Original Filed July 8, 1955 4 Sheets-Sheet 1

Inventor
Rupert E. H. Carpenter
By Ralph B. Stewart
Attorney

POLARISED ELECTROMAGNETIC RELAYS AND LIKE DEVICES

Original Filed July 8, 1955 4 Sheets-Sheet 2

Inventor
Rupert E. H. Carpenter
By Ralph B. Stewart
Attorney

POLARISED ELECTROMAGNETIC RELAYS AND LIKE DEVICES

Original Filed July 8, 1955 4 Sheets-Sheet 3

Inventor
Rupert E. H. Carpenter
By Ralph B. Stewart
Attorney

POLARISED ELECTROMAGNETIC RELAYS AND LIKE DEVICES

Original Filed July 8, 1955 4 Sheets-Sheet 4

Inventor
Rupert E.H. Carpenter
By Ralph D. Stewart
Attorney

United States Patent Office

Re. 24,998
Reissued June 6, 1961

24,998
POLARISED ELECTROMAGNETIC RELAYS AND LIKE DEVICES

Rupert E. H. Carpenter, 35 Croham Valley Road, South Croydon, England

Original No. 2,816,976, dated Dec. 17, 1957, Ser. No. 520,853, July 8, 1955. Application for reissue Feb. 3, 1959, Ser. No. 790,995
12 Claims. (Cl. 200—93)

Matter enclosed in heavy brackets [ ] appears in the original patent but forms no part of this reissue specification; matter printed in italics indicates the additions made by reissue.

This invention relates to polarised electromagnetic instruments, such as polarised electromagnetic relays and polarised telephone indicators, having a magnetic circuit which is linked with the operating or signals winding of the instrument and which includes opposed pole-faces, with the armature pivoted in the gap between these pole-faces so as to be able to rock to and from them to produce a change in the lengths of the air gaps between the armature and the pole-faces.

In such instruments, the operating or signals flux flows from one pole-face to the other through the armature. Since, however, the latter has hitherto always consisted solely of the permanent magnet which produces the polarising flux, and since permanent magnetic alloys have small permeability, this armature introduced into the operating or signals magnetic circuit an undesirable reluctance, and this caused such instruments to have low efficiency.

The object of the present invention is to provide an instrument having a much greater efficiency than those used hitherto.

Thus, according to the invention, at least a part of the armature comprises a member of magnetically soft material, such as soft iron, which receives polarising flux directly from a permanent magnet and which serves as a bridge of low reluctance to carry operating or signals flux across the gap between the pole-faces. This reduction in the reluctance in the operating or signals magnetic circuit then causes an increase in the operating or signals flux and this leads to an increase in the efficiency of the instrument.

In the preferred form of a relay constructed according to the invention, the armature consists of the polarising magnet and two members of magnetically soft material fixed to it, one at either end. In another form, however, the polarising magnet is stationary and the members of magnetically soft material are then connected together and pivoally mounted to act as the armature.

Preferably the armature is substantialy enclosed within a housing or box which is made up in part of the pole-faces and two parallel spacing members extending along adjacent sides of the two pole-faces and acting to maintain them a fixed distance apart and on which the contact assembly of the relay is mounted. This enclosure thus substantially prevents the ingress of magnetic and other particles particularly during manufacture.

Two examples of polarised electromagnetic relays constructed according to the invention will now be described with reference to the accompanying drawings, in which.

Figure 1:
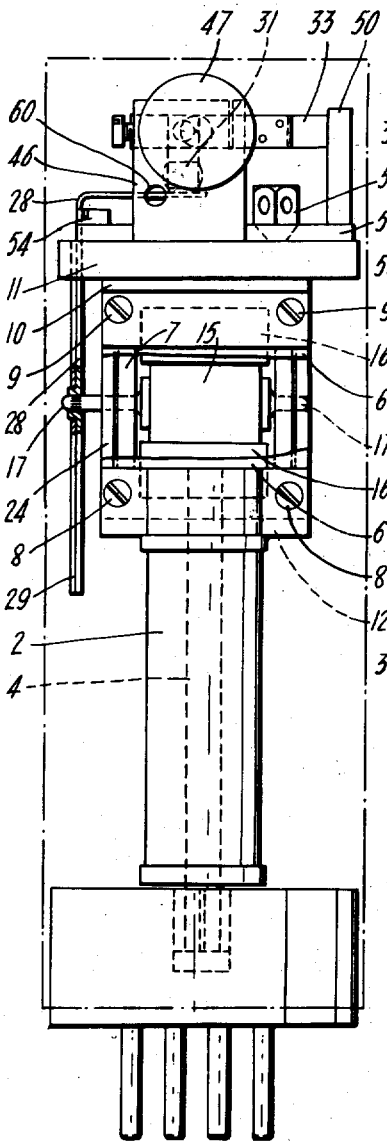
FIGURE 1 is a side elevation of the first example, partly broken away to show the major part of the armature.
Figure 2:
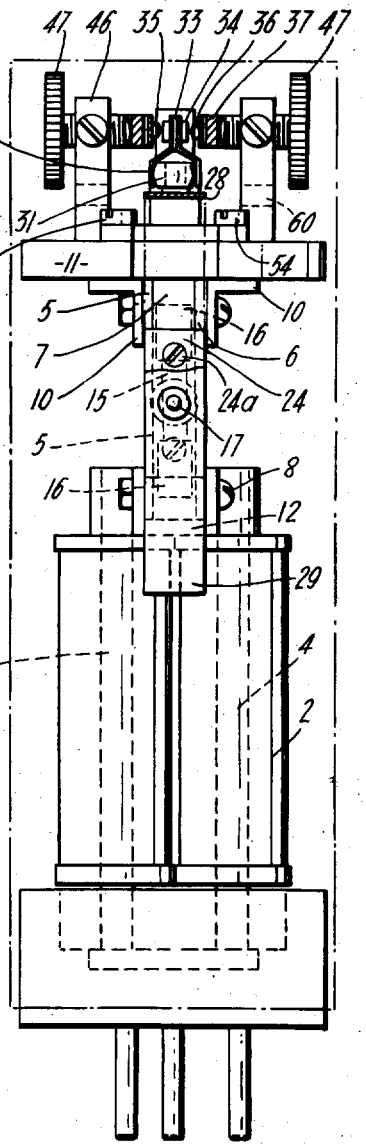
FIGURE 2 is a corresponding front elevation partly broken away to show part of the plates which consitute the pole-faces, and showing in dotted lines the rest of the plates and the armature between them.

Referring first of all to FIGURES 1 and 2, the signals magnetic structure includes two signal coils 1 and 2 arranged side by side and having corresponding mumetal cores 3 and 4 which are joined together at their lower ends. These cores extend upwards outside the coils and are connected to corresponding flat parallel mumetal plates 5 and 6 which constitute the pole faces between which the armature of the relay rocks. The plates 5 and 6 are maintained a fixed distance apart by two upright non-magnetic bars 7 which are arranged between the plates 5 and 6 along their adjacent vertical sides. The faces of the bars in contact with the plates are accurately finished so that the distance between the plates is accurately determined. The lower ends of the plates and the bars and the extension of the cores 3 and 4 are held in position by two bolts 8, whilst two further bolts 9 hold in position the upper ends of the plates and the bars and also two brackets 10, upon the upper surface of which is mounted an insulating disc 11, for example, of "mycalex," that is a material containing flakes of mica with glass as the binding material. This disc 11 carries the contact arrangement of the relay. A bottom plate 12 is fixed across the bottom of the plates 5 and 6 and the bars 7, so that the armature is completely enclosed within a box made up of this bottom plate 12, the disc 11, the bars 7 and the plates 5 and 6. This particular design of relay thus substantially prevents magnetic or other particles from penetrating into regions near the armature.

The armature, which is pivoted between the centres of the two brass bars 7 as described below, consists of a permanent magnet 15 of rectangular cross-section and two similar radiometal end pieces 16 secured to the magnet 15 at its poles, that is at the top and bottom.

The two radiometal end-pieces 16, which may be laminated, are secured to the magnet 15 in one of several different ways. Thus powder metallurgy techniques may be utilised, by arranging within a mould the two materials in powder form, applying the necessary high pressure and finally sintering the powders to form the composite armature, this thus being made in one piece.

In another method, the parts are secured together by dovetailing.

Another method of securing the parts together is by using an epoxy resin such as one of those sold under the trade name of "Araldite," and yet another method is using solder.

Again the pole-pieces may be clamped on the ends of the permanent magnet for example by means of non-magnetic strips running down the sides of the armature and held by screws to the pole-pieces, the edges of the strips being bent around the sides of the magnet.

The end pieces 16 have a greater thickness than the magnet, so that the distance between each end piece and the plate 5 or 6 is correspondingly small, thus concentrating the polarising flux at the ends of the armature. Because of the properties of radiometal, there is a very uch smaller reluctance in the signals magnetic circuit an when permanent magnet material alone is used as e armature. Thus a very much higher degree of effi- ency is obtained. Since the incremental permeability radiometal decreases, however, as it approaches satu- tion, the parts of the magnetic structure which carry the ajor part of the polarising flux as well as the signals flux, at is the end pieces 16 and the plates 5 and 6, are made sufficient cross-sectional area to keep the flux density a low value so that the path traversed by the signals ix has a satisfactorily high value of incremental per- eability.

Figure 3:
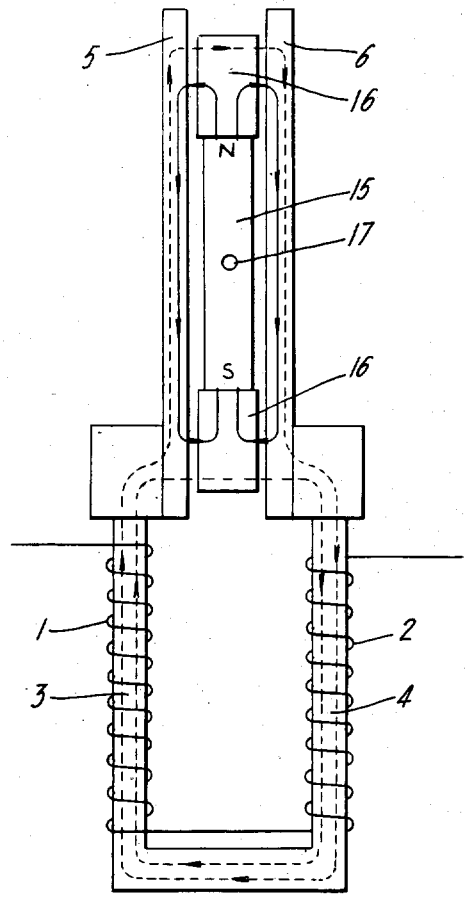
FIGURE 3 is a diagrammatic view of the polarising and signals magnetic circuits of either of the two examples.
Figure 6:
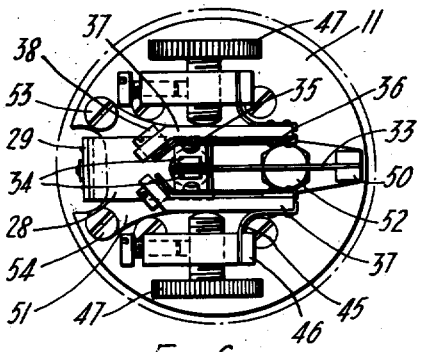
FIGURE 6 is a plan view of the contact assembly of either of the two examples.

The polarising and signals magnetic circuits are shown FIGURE 3. The flux flowing through the polarising rcuit is shown in full lines and is always in the direc- on shown, whilst the flux flowing through the signals rcuit is shown in dotted lines and its direction depends on that of the current in the signal coils 1 and 2. It ill be understood that the polarising flux will usually many times as great as the signals flux. It can be en that when the signals flux is in the direction indi- ted, the magnetic fields are strongest to the right of e top end-piece and to the left of the bottom end piece, id this causes the armature to rock in a clockwise di- ction. Reversal of current in the signals coils 1 and 2 ill obviously cause the armature to rock in the reverse rection. It will be noticed that any such rocking anges only the lengths of the air gaps between the mature and the plates 5 and 6, and does not alter their eas.

Figure 9:
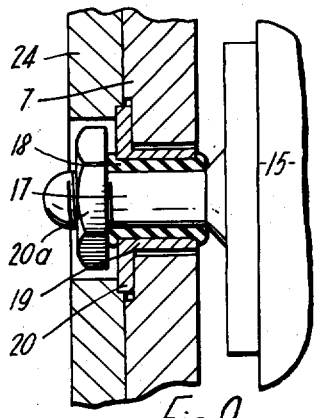
FIGURE 9 shows the alternative method of pivoting the armature.
Figure 4:
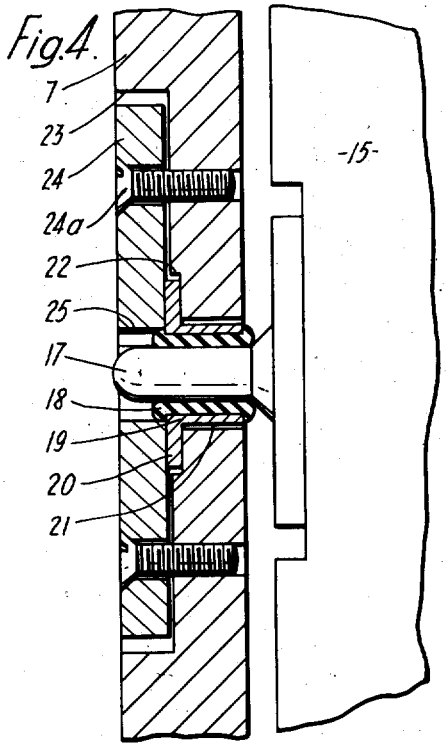
FIGURE 4 is a side elevation mainly in section, of the pivoting arrangement of the armature of either of the two examples.
Figure 5:
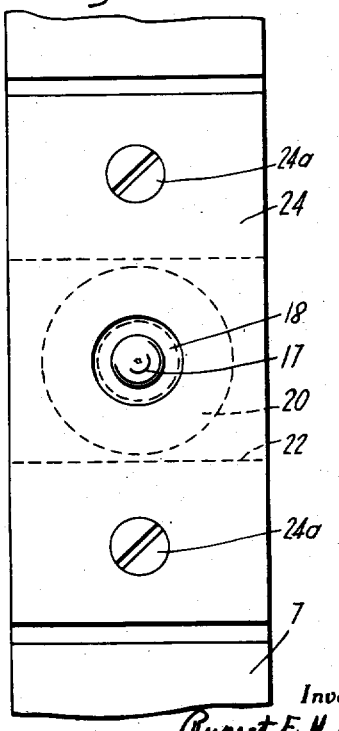
FIGURE 5 is the front elevation corresponding to FIGURE 4.

As can be seen most easily in FIGURES 4 and 5, two ns 17, fixed onto the sides of the magnet 15 and acting the pivot of the armature, are each held within a rresponding sleeve 18 made of an elastomer such as licone rubber, each sleeve being held within a metallic lindrical holder 19 formed with a circular flange 20 the end further from the armature. Each elastomer eeve 18 may be bonded to either the holder or to the n or to both in order to prevent it slipping. In an ternative arrangement, shown in FIGURE 9, the end of ch pin 17 is screw-threaded to cooperate with a nut 20a hich maintains the sleeve 18 in position. Both these rangements are in accordance with my co-pending ap- lication Ser. No. 529,467, filed August 19, 1955. In- ead of using this elastomer pivoting system, the arma- re may be mounted on springs, for example springs of e type described in my British patent specification No. 34,352.

Each holder 19 is held within a corresponding bore 1 formed in one of the non-magnetic bars which thus erve both to determine the gap between the plates 5 nd 6 and to support the armature pivoting system. The uter diameter of each holder 19 is smaller than that of s bore 21 so that, until the holders 19 are clamped in osition, the armature may be adjusted with respect to e plates 5 and 6. Each of the flangers 20 lies in a corre- onding shallow groove 22 formed across the bar 7 nd the sides of the two plates 5 and 6, this groove 22 ing within a deeper and longer portion 23 also cut cross the bar 7 and the sides of the plates 5 and 6. he groove 22 is made only just slightly wider than the uter diameter of the circular flange 20, so that the ivot of the armature is fixed in a vertical direction but, wing to the loose fit of the holder 19 in its bore 21, it an be moved at right angles to this direction so that the rmature may be adjusted with respect to the plates 5 nd 6. During the assembly of the relay, spacing shims not shown) are temporarily inserted between the arma- re and these plates 5, 6, the shims having a thickness correspond to the required width of the air gaps, and e pivot 17 of the armature is then fixed by a non- agnetic plate 24 which fits into the cut-away portion 3 and which is fixed by screws 24a onto the bar. Thus e centre portion of this plate 24, which is formed with small aperture 25 through which the pin 17 of the armature may pass, presses against the flange 20 to maintain it in its correct position.

One of the pins 17 is longer than the other (see FIGURE 1) and passes through the corresponding aper- ture 25. Thus a long upright magnetic strip 28, fixed to this longer pin 17 and extending from near the top of the signals coils 1, 2 to just above the disc 11, rocks to and fro with the pin 17 and the armature and thereby serves to convey the rocking effect of the armature to the con- tact-making arrangement on the disc 11. Lying on the strip 28, and held to it by its own flux is a permanent magnet in the form of a thin plate 29 which is pivoted freely about a cylindrical boss 30 formed on the outer surface of the strip 28. This thin plate 29 serves to produce an inertia damping effect on oscillations of the armature in the manner disclosed in my British patent specification No. 673,867. In order to bring about opera- tion of the contacts, the strip 28 is turned over at the top through a right angle so as to form a horizontal platform on which is secured a barrel-shaped insulating bead 31 which then rocks with the armature.

Two ears 32 which are fixed to and depend from a spring arm 33 extending at right angles to the direction of movement of the bead 31 are spread to engage the bead 31 on opposite sides. Thus rocking of the bead causes the spring arm 33, together with a pair of con- ducting studs 34 forming the moving relay contacts which it carries near the ears, to move in one direction or the other depending upon the direction of rocking of the bead 31. The side contacts with which the moving contacts 34 cooperate lie, of course, on opposite sides of the spring arm 33 and are arranged to provide a de- gree of friction damping to reduce contact chatter and oscillation on impact, as explained in British patent specification No. 484,472. Thus each of these side con- tacts consists of a stud 35 mounted on a spring strip 36 which is fixed at one end to a rigid backing bar 37 so that the strip 36 and the bar 37 lie roughly parallel to, but spaced from, each other. The free end of the strip 36 and the nearby end of the bar 37 are bent to- wards the arm 33, and a plug 38 having a front face with a desired frictional characteristic is screwed through this bent part of the backing bar so that the free end of the strip bears upon the friction surface. Now when one of the studs 34 makes contact with one of the studs 35, the strip 36 is pushed towards the backing bar and at the same time the free end of the strip slides over the friction surface. The enrgy thus absorbed reduces any tendency to chatter or to oscillate of the studs. When the thin plate 29 is employed thereby producing an inertia damping effect as previously mentioned, the plugs 38 may be dispensed with.

Each backing bar 37 is supported by a correspond- ing resilient strip 45 connected at one end to the back of the bar and at the other end to an upright post 46 which is mounted on the disc 11. Each strip 45 is turned through a right angle and so fixed to the post that the backing bar 37 is approximately parallel to one of the surfaces of the post 46 and presses on the front of ad- justing screw 47 which is screwed through the post 46. Thus the positions of the studs 35 are controlled by these adjusting screws.

It is important in relays generally, to ensure that the magnetic and mechanical dead centres of the central contract supporting structure coincide. This is because these centres change with temperature (and also with age) by different amounts and thus, unless they are ini- tially coincident, large errors produced by the drift of the zero position of the central contact supporting struc- ture are found. In order to enable this coincidence of the two centres to be brought about, the spring arm 33 is anchored at its fixed end in an upright post 50 mount- ed at the apex of a triangular horizontal plate 51 which is adjustably fitted onto the plate 11. This adjustable fitting is brought about by a hexagonally headed screw 52 with a conical under-surface which acts as a pivot for the plate, and two screws 53 and 54 the shank portions of which are of smaller diameter than that of the bores in the plate 51 through which they pass. Thus the whole plate 51 (carrying with it the spring arm 33 and the studs 34) may be turned through a small angle about the screw 52 with a suitable tool, the plate then being locked in position by tightening all three screws.

The arrangement just described enables the coincidence of the two dead centres to be easily brought about during the assembly of the relay. First of all the spring arm 33 is raised from between the studs 35. Two positioning contact screws (not shown) are then screwed into corresponding screw-threaded holes 60 tapped in the upright posts 46 below the axis of the adjusting screws 47, and just opposite the strip 28. These positioning contact screws are screwed into the holes 60 until the signals current required for the strip 28 to move from the front face of one of them to the front face of the other is the same as that required for the reverse process, and the positioning contact screws are advanced so as to make the movement of the armature as small as practicable consistent with observing the neutrality of the bias. The spring arm 33 is then lowered, and the plate 51, upon which it is mounted, is turned through such an angle that the neutrality of the armature bias is unimpaired. The nut 52 and the screws 53 and 54 are then tightened so that the mechanical dead-centre is fixed in coincidence with the magnetic dead-centre.

Figure 7:
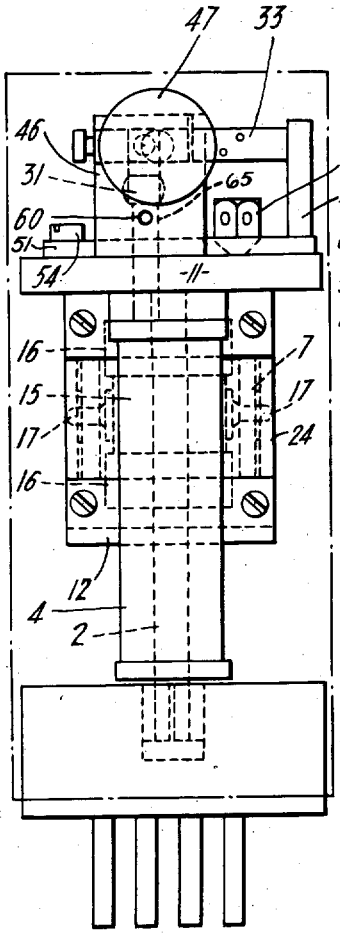
FIGURE 7 is a side elevation of the second example, and corresponds to FIGURE 1.
Figure 8:
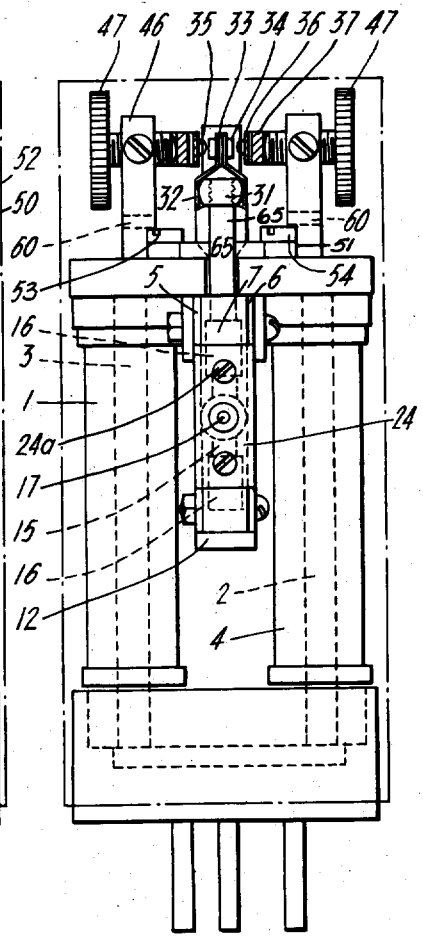
FIGURE 8 is the front elevation corresponding to FIGURE 7 and thus corresponds to FIGURE 2.

The second example of a relay constructed according to the invention, is illustrated mainly in FIGURES 7 and 8, and differs from the first example firstly in the position of the housing or box for the armature relative to the signals coils 1 and 2, and secondly in the arrangement for conveying the rocking effect of the armature to the contact assembly. Thus the housing, which again consists of the plates 5 and 6, the bars 7, the disc 11 and the bottom plate 12, is arranged between the two signals coils 1 and 2 so that this relay is shorter and fatter than that of the first example. The bead 31 is carried, not on the strip 28, but on a vertical metallic pin 65 fixed into the upper radiometal end piece 16 of the armature, and projecting through a hole in the disc 11. The upper radiometal end piece 16 is formed with a hole to counteract the effect of the pin so that the centre of gravity of the armature lies on the pivotal axis of the armature. Instead of providing on the top of the pin 65 a bead made wholly of insulating material, a metallic ring (not shown), the outside surface of which forms part of a sphere, may be mounted on the pin 65, with an elastomer sleeve interposed between the pin and the ring. The flexibility which this elastomer sleeve introduces reduces distortion of the spring arm 33 should the ring be gripped so tightly as not to slide in the embrace of the ears 32.

When the pin 65 is used to convey the rocking effect of the armature to the contact assembly, as described above, there is, of course, no need for one of the pins 17 to be extended outside the armature box. However, if it is desired to employ inertia damping as before, to reduce oscillations of the armature, one of the pins 17 is so extended, and carries a flat strip, not bent over at the top to form a platform as in the form shown in FIGURES 1 and 2, and to this strip, a permanent magnet in the form of a thin plate is allowed to adhere as before.

Either of the relays described above may easily be converted into a one side stable relay by forming a threaded hole in one of the plates 5 and 6 near one of the radiometal end pieces and employing an externally threaded plug within this hole to effect adjustments in the stability. The unsymmetrical stability may be increased by providing a further hole and plug in the other plate opposite the other end piece.

I claim:

1. A polarised electromagnetic device comprising, a signal winding having a core, a *ferro*-magnetic structure connected to the ends of said core and *including two spaced stationary pole pieces with parallel pole faces, said structure* providing two parallel paths for signal flux *between said pole pieces,* [each path including opposed stationary pole faces between which signal flux flows, the two magnetic paths being spaced apart in a direction normal to the direction of flux flow between the pole faces of each path,] an elongated armature having a magnetically soft end portion located between the pole faces in one [magnetic path] *of said signal flux paths* and another magnetically soft end portion located between the pole faces in the other [magnetic] *signal flux* path, *each of said end portions being flat and having its dimension perpendicular to said pole faces less than its dimension longitudinally with respect to said armature,* means mounting said armature for pivotal movement about an axis located between said flux paths, whereby, as said armature moves, said end portions approach and recede from said pole faces to alter the lengths of the gaps between said pole faces and said end portions, as measured normal to said pole faces, and a permanent magnet interposed between said end portions of said armature and establishing polarising flux flow through the said end portions in series *and mainly longitudinally with respect to said armature.*

[2. A polarised device according to claim 1, wherein said magnetic structure including a pair of pole pieces connected magnetically to said core and each having a flat surface constituting the pole faces on one side of said armature, said flat surfaces being parallel both to one another and to the facing surfaces of said soft-iron end portions, when said armature lies in a symmetrical position between said pole faces.]

3. A device according to claim 1, [wherein said polarising magnet is a permanent magnet, and] the distance between each of said pole faces and the facing surfaces of said end pieces being less, when the armature lies in a symmetrical position between said pole faces than the distance between the said magnet and the nearest part of the said magnetic structure.

4. A polarised device according to claim 1, wherein said permanent magnet is embodied in said armature and said [soft-iron] end portions are secured to said magnet at its ends to make up [the whole of] said armature.

5. A polarised device according to claim 1, wherein [the whole of] said armature comprises a sintered structure.

6. A polarised device according to claim 1, [wherein said magnetic structure including a pair of pole pieces formed with surfaces constituting the opposed stationary pole faces of both of said magnetic paths] said pole pieces being spaced from one another by two [parallel] non-magnetic spacing members which, together with the pole pieces, constitute the major portion of a housing in which the armature is substantially [completely] enclosed.

7. A polarised device according to claim 6 wherein a movable part of said armature extends out of said housing and including a [contact assembly mounted on said housing in a position to be operated] *movable contact operable* by said movable part *and a side contact arranged to cooperate with said movable contact.*

8. A polarised device according to claim 7, [and including] *said movable part comprising* an arm fixed outside said housing to the pivot of said armature so as to rock with it [, said arm controlling said contact assembly].

9. A polarised device according to claim 8, and including a contact-supporting piece which constitutes part of said housing, [and said contact assembly comprises a rigid member adjustably mounted on said contact supporting piece, a resilient strip carried by *and movable with* said rigid member [and movable with it, a part of] *and carrying said* movable [contacts carried by said strip and having a position controlled by said arm, and pair of side contacts arranged for cooperation with aid movable contacts] *contact.*

10. A polarised device according to claim 9, wherein aid rigid member is pivoted on said contact supporting iece so as to enable said moving [contacts] *contact nd said strip* to be moved relatively to the side contacts] *contact,* whereby the mechanical and magetic dead centers of the [contact assembly] *armature* ıay be made coincident.

11. A polarised device according to claim 1, [wherein aid magnetic structure including a pair of pole pieces ɔrmed with surfaces constituting said pole faces of both f said air gaps] said pole pieces being spaced from one nother by two [parallel] non-magnetic spacing members hich serve as supports for the armature pivoting ystem.

12. A polarised device according to claim 1, and inluding resilient means acting on said armature to oppose ıe forces due to said polarising magnet, said resilient ıeans being adjustable relatively to said pole faces so ıat the positions of zero mechanical and zero magnetic force acting on said armature may be brought in coincidence.

13. A polarised device according to claim 12, and including a [pivotally] *movably* mounted plate, *the position of* said resilient means being [mounted on] *determined by* said plate and being adjusted as said plate is [turned] *moved,* and means for clamping said plate in the adjusted position.

References Cited in the file of this patent or the original patent

UNITED STATES PATENTS

| | | |
|---|---|---|
| 1,329,578 | Burrows | Feb. 3, 1920 |
| 1,893,856 | Broughton | Jan. 10, 1933 |
| 2,666,826 | Bengtsson | Jan. 19, 1954 |
| 2,741,728 | Distin | Apr. 10, 1956 |

FOREIGN PATENTS

| | | |
|---|---|---|
| 625,531 | Great Britain | June 29, 1949 |
| 1,083,477 | France | June 30, 1954 |